US012233869B2

(12) United States Patent
Manita et al.

(10) Patent No.: US 12,233,869 B2
(45) Date of Patent: Feb. 25, 2025

(54) VEHICLE TRAVEL ASSISTANCE SYSTEM

(71) Applicant: SUBARU CORPORATION, Tokyo (JP)

(72) Inventors: Natsuki Manita, Tokyo (JP); Kensuke Inamoto, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 0 days.

(21) Appl. No.: 17/849,151

(22) Filed: Jun. 24, 2022

(65) Prior Publication Data
US 2023/0014274 A1 Jan. 19, 2023

(30) Foreign Application Priority Data
Jul. 13, 2021 (JP) ................................ 2021-115862

(51) Int. Cl.
B60W 30/14 (2006.01)
B60W 10/04 (2006.01)
B60W 10/18 (2012.01)

(52) U.S. Cl.
CPC .......... *B60W 30/143* (2013.01); *B60W 10/04* (2013.01); *B60W 10/18* (2013.01); *B60W 2520/10* (2013.01); *B60W 2720/10* (2013.01)

(58) Field of Classification Search
CPC .... B60W 30/143; B60W 10/04; B60W 10/18; B60W 2520/10; B60W 2720/10; B60W 30/182
See application file for complete search history.

(56) References Cited

U.S. PATENT DOCUMENTS

| 2009/0048755 A1* | 2/2009 | Tokimasa | B60K 31/00 701/70 |
| 2011/0060512 A1* | 3/2011 | Bohley | B60W 30/143 701/93 |

(Continued)

FOREIGN PATENT DOCUMENTS

| CN | 112109724 A | * 12/2020 | ............ B60W 30/14 |
| JP | 2016-013762 A | 1/2016 | |
| JP | 2020-168915 A | 10/2020 | |

OTHER PUBLICATIONS

CN-112109724-A Translation (Year: 2020).*

Primary Examiner — Kenneth J Malkowski
Assistant Examiner — Ibrahim Abdoalatif Alsomairy
(74) Attorney, Agent, or Firm — Rimon P.C.

(57) ABSTRACT

A vehicle travel assistance system includes a travel assistance control unit, an operation unit, and a travel assistance setting unit. The travel assistance control unit is configured to perform travel assistance in a braking-and-driving-force distribution control mode and an automatic cruise control mode. The travel assistance setting unit supplies, to the travel assistance control unit, setting information of travel assistance in response to the received operation under a condition that the operation received by the operation unit is for selecting the braking-and-driving-force distribution control mode, the travel assistance setting unit automatically supplies setting information of the braking-and-driving-force distribution control mode to the travel assistance control unit regardless of the operation in a case where a speed of the vehicle becomes an automatic deactivation speed or higher and thereafter becomes an automatic reactivation speed or lower.

5 Claims, 9 Drawing Sheets

(56) References Cited

U.S. PATENT DOCUMENTS

2019/0232961 A1* 8/2019 Baier .................... B60W 30/16
2020/0317197 A1* 10/2020 Kubo .................... B60W 50/10

* cited by examiner

| MODE | MEANING | BRAKING-AND-DRIVING-FORCE DISTRIBUTION CONTROL |
|---|---|---|
| X-MODE | ROUGH-ROAD TRAVELING MODE | YES |
| I-MODE | NORMAL TRAVELING MODE | NO (DRIVING-FORCE CONTROL) |
| S-MODE | SPORT TRAVELING MODE | NO (DRIVING-FORCE CONTROL) |

FIG. 3

| AUTOMATIC CRUISE CONTROL |
|---|
| PRECEDING-VEHICLE FOLLOWING SPEED CONTROL WITHIN SET SPEED |
| LANE KEEP CONTROL |
| LANE CHANGE CONTROL |

FIG. 4

| | | CURRENT SETTING | | | | | |
|---|---|---|---|---|---|---|---|
| | | ① LOW SPEED (VEHICLE SPEED ≤ 20km/h (= LOW ACCEPTANCE SPEED)) | ② | ③ | ④ HIGH SPEED (VEHICLE SPEED ≥ 40km/h (= HIGH ACCEPTANCE SPEED)) | ⑤ | ⑥ |
| | | ACC:OFF X-MODE:OFF | ACC:ON X-MODE:OFF | ACC:OFF X-MODE:ON | ACC:ON X-MODE:OFF | ACC:OFF X-Mode: AUTOMATIC REACTIVATION WAITING | ACC:OFF X-MODE:OFF |
| OPERATION/ CHANGE IN TRAVELING STATE | VEHICLE SPEED UP; VEHICLE SPEED ≥ 40km/h (= AUTOMATIC DEACTIVATION SPEED) | ⑥ | ④ | ⑤ | ④ | ⑤ | ⑥ |
| | VEHICLE SPEED DOWN; VEHICLE SPEED ≤ 20km/h (= AUTOMATIC REACTIVATION SPEED) | ① | ② | ③ | ② | ③ | ① |
| | X-MODE SW ON | | ③ | ② | ④ | ⑤ | ⑥ |
| | ACC SW ON | ② | | ③ | ④ | ④ | |

FIG. 9

VEHICLE TRAVEL ASSISTANCE SYSTEM

CROSS-REFERENCE TO RELATED APPLICATIONS

The present application claims priority from Japanese Patent Application No. 2021-115862 filed on Jul. 13, 2021, the entire contents of which are hereby incorporated by reference.

BACKGROUND

The technology relates to a vehicle travel assistance system.

Japanese Unexamined Patent Application Publication No. 2020-168915 discloses an automatic cruise travel assistance function as a vehicle travel assistance function.

Japanese Unexamined Patent Application Publication No. 2016-013762 discloses a rough-road travel assistance function as the vehicle travel assistance function. The rough-road travel assistance function involves execution of braking-and-driving assistance in which distribution of a driving force or a braking force to a plurality of wheels of a vehicle is adjusted.

SUMMARY

An aspect of the technology provides a vehicle travel assistance system that includes a travel assistance control unit, an operation unit, and a travel assistance setting unit. The travel assistance control unit is configured to perform travel assistance for traveling of a vehicle in a braking-and-driving-force distribution control mode and configured to perform travel assistance for the traveling of the vehicle in an automatic cruise control mode adapted to all vehicle speeds. The braking-and-driving-force distribution control mode is a control mode in which distribution of a driving force or distribution of a braking force to a plurality of wheels of the vehicle is adjusted while the vehicle is traveling at a low speed. The operation unit is configured to receive an operation related to the vehicle. The travel assistance setting unit is configured to supply, to the travel assistance control unit, setting information of travel assistance in response to the operation received by the operation unit. Under a condition that the operation having been received by the operation unit is for selecting the braking-and-driving-force distribution control mode, the travel assistance setting unit is configured to automatically supply the setting information of the braking-and-driving-force distribution control mode to the travel assistance control unit regardless the operation in a case where a speed of the vehicle becomes an automatic deactivation speed or higher and thereafter becomes an automatic reactivation speed or lower. The automatic deactivation speed is a speed for which the travel assistance control unit automatically deactivates the travel assistance in the braking-and-driving-force distribution control mode. The automatic reactivation speed is lower than the automatic deactivation speed.

An aspect of the technology provides a vehicle travel assistance system that includes an operation unit, first circuitry, and second circuitry. The operation unit is configured to receive an operation related to a vehicle. The first circuitry is configured to perform travel assistance for traveling of the vehicle in a braking-and-driving-force distribution control mode or an automatic cruise control mode adapted to all vehicle speeds. The braking-and-driving-force distribution control mode is a control mode in which distribution of a driving force or distribution of a braking force to a plurality of wheels of the vehicle is adjusted while the vehicle is traveling at a low speed. The second circuitry is configured to supply, to the first circuitry, setting information of travel assistance in response to the operation received by the operation unit. Under a condition that the operation having been received by the operation unit is for selecting the braking-and-driving-force distribution control mode, the second circuitry is configured to automatically supply the setting information of the braking-and-driving-force distribution control mode to the first circuitry regardless the operation in a case where a speed of the vehicle becomes an automatic deactivation speed or higher and thereafter becomes an automatic reactivation speed or lower. The automatic deactivation speed is a speed for which the first circuitry automatically deactivates the travel assistance in the braking-and-driving-force distribution control mode. The automatic reactivation speed is lower than the automatic deactivation speed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

FIG. 3 is an explanatory diagram illustrating examples of driving-system control modes among which a driving-system control for the vehicle illustrated in FIG. 1 is switched.

FIG. 4 is an explanatory diagram illustrating an example of an automatic cruise control mode for the vehicle illustrated in FIG. 1.

FIG. 9 is a transition diagram describing examples of travel assistance settings to be configured by the travel assistance setting apparatus for the vehicle illustrated in FIG. 2.

DETAILED DESCRIPTION

Figure 1:
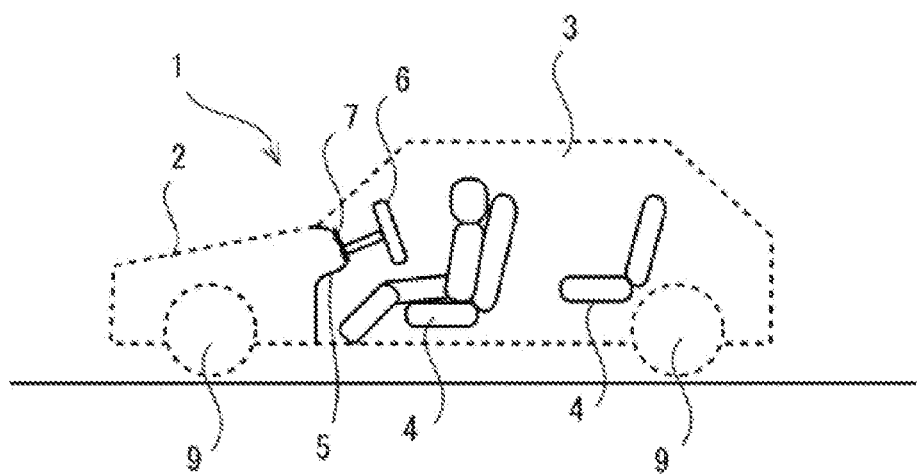
FIG. 1 is an explanatory diagram illustrating an example of a vehicle to which a travel assistance system according to one embodiment of the technology is to be applied.

In the following, some example embodiments of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the technology are unillustrated in the drawings.

FIG. 1 is an explanatory diagram illustrating an example of a vehicle 1 to which a travel assistance system according to one embodiment of the technology is to be applied. The vehicle 1 may be, for example but not limited to, an automobile.

FIG. 1 is a schematic side view of the vehicle 1.

The vehicle 1 may be an example of a vehicle. Referring to FIG. 1, the vehicle 1 may include a vehicle body 2. The vehicle body 2 may be provided with a vehicle compartment 3, and a plurality of wheels 9 disposed in a front part and a rear part of the vehicle 1. The vehicle compartment 3 may be provided with a plurality of rows of seats 4 which an occupant such as a driver riding the vehicle 1 to sit on. A dashboard 5 may be provided at a front portion of the vehicle compartment 3 which is a portion in front of the seat 4 in a front row. The dashboard 5 may extend in a vehicle-width direction of the vehicle body 2 of the vehicle 1. For example, a steering wheel 6 and a meter panel apparatus 7 may be provided at a portion of the dashboard 5 in front of the seat 4 which the driver is to sit on. The meter panel apparatus 7 may include a liquid crystal device, and display information such as a current speed of the vehicle 1 while the vehicle 1 is traveling.

The driver may operate, for example, the steering wheel 6, an accelerator pedal, a brake pedal, a gear shift lever, and various operation buttons to thereby perform an operation related to traveling of the vehicle 1, while checking, for example, an environment around the vehicle 1 and the information displayed on the meter panel apparatus 7.

Figure 2:
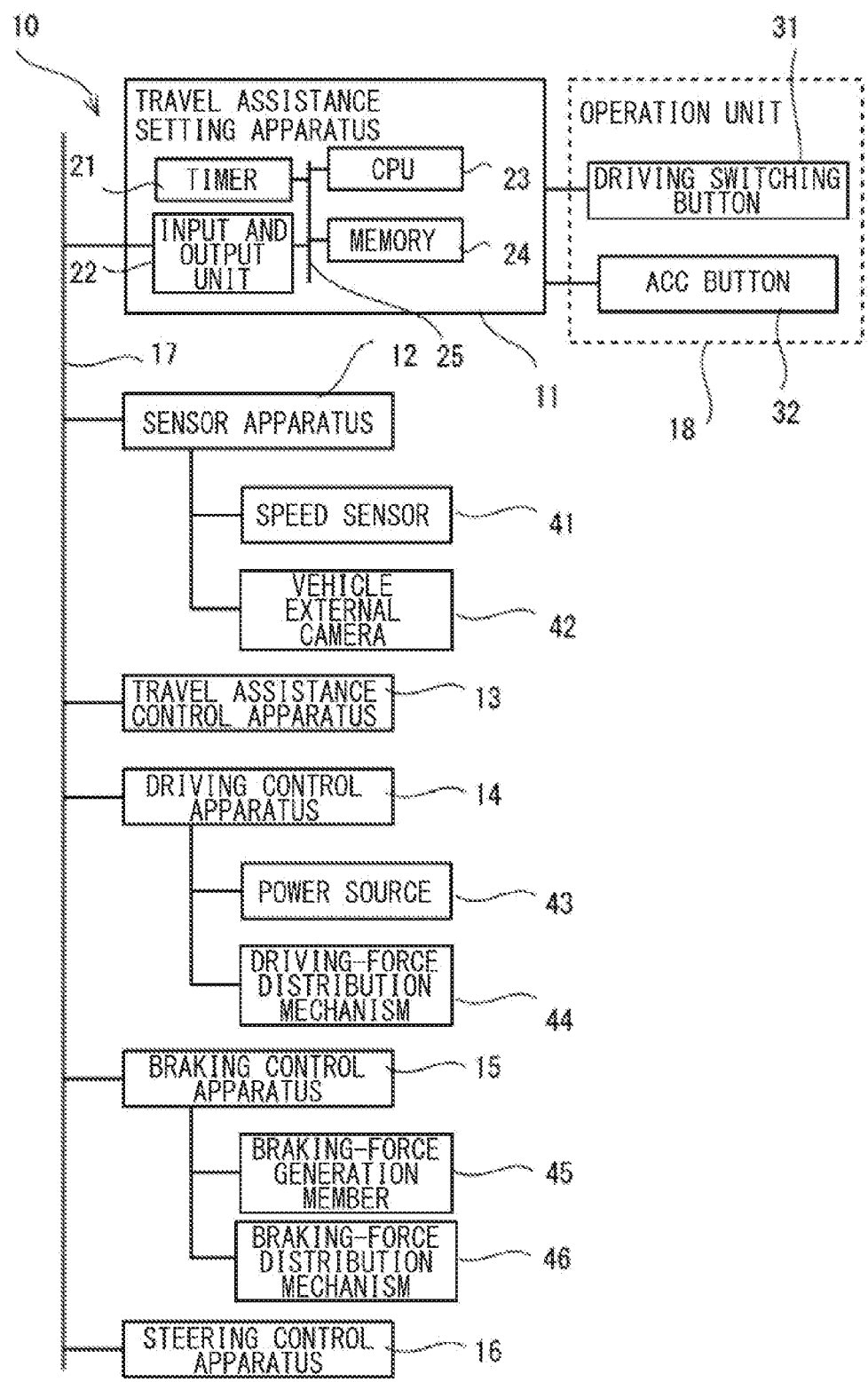
FIG. 2 is an explanatory diagram illustrating an example of a control system that serves as the travel assistance system for the vehicle illustrated in FIG. 1.

FIG. 2 is an explanatory diagram illustrating an example of a control system 10 that serves as a travel assistance system for the vehicle 1 illustrated in FIG. 1.

Referring to FIG. 2, the control system 10 may include a travel assistance setting apparatus 11, a sensor apparatus 12, a travel assistance control apparatus 13, a driving control apparatus 14, a braking control apparatus 15, and a steering control apparatus 16, and also include an in-vehicle network 17 to which these apparatuses are coupled. In one embodiment, the travel assistance setting apparatus 11 may serve as a "travel assistance setting unit". In one embodiment, the travel assistance control apparatus 13 may serve as a "travel assistance control unit".

In one example, the in-vehicle network 17 may be a wired communication network for the vehicle 1 compatible with, for example, a controller area network (CAN) or a local interconnect network (LIN). In another example, the in-vehicle network 17 may be a network for communication such as a local area network (LAN). In still another example, the in-vehicle network 17 may be any combination of the above-described networks. In one example, the in-vehicle network 17 may partially include a wireless communication network. The various apparatuses coupled to the in-vehicle network 17 may mutually transmit and receive data via the in-vehicle network 17. In one example, the data transmitted and received via the in-vehicle network 17 may be encrypted and transmitted and received via the in-vehicle network 17 as packet data to which a transmission source ID and a destination ID are added.

Coupled to the sensor apparatus 12 may be various sensors provided in the vehicle 1. As illustrated in FIG. 2, examples of the sensors coupled to the sensor apparatus 12 may include a speed sensor 41 and a vehicle external camera 42. The speed sensor 41 may detect a current speed of the vehicle 1. The vehicle external camera 42 may perform imaging of a region surrounding the vehicle body 2 of the vehicle 1, e.g., a region in front of the vehicle 1. The sensor apparatus 12 may be a processor that controls respective operations of the various sensors coupled thereto, and obtains detection information from the various sensors. Further, in one example, the sensor apparatus 12 may generate additional information on the basis of the detection information obtained from the various sensors. For example, the sensor apparatus 12 may execute a vehicle-external-object estimation process on an image captured by the vehicle external camera 42 to thereby generate information including a relative direction and a relative distance of a vehicle external object. The sensor apparatus 12 may output the detection information obtained from the various sensors and the generated information to the in-vehicle network 17.

Coupled to the driving control apparatus 14 may be, for example, a power source 43 and a driving-force distribution mechanism 44. The power source 43 may be provided to allow the vehicle 1 to travel. For example, the power source 43 may be an internal combustion engine that burns a fuel such as gasoline or ethanol, an electric motor using an accumulated electric power, a power source using hydrogen, or a hybrid power source including any combination of these power sources. The driving-force distribution mechanism 44 may transfer a driving force generated by the power source 43 to the wheels 9 of the vehicle 1. The driving-force distribution mechanism 44 may include, for example, a so-called transmission, a shaft, and differential gears. The vehicle 1 in the example embodiment may include a four-wheel-drive driving mechanism, and each of the four wheels 9 may be rotatable by an individual driving force. In one example, the driving-force distribution mechanism 44 may adjust the driving force distributed to the four wheels 9 on the basis of a setting and a traveling situation such as a slipping situation. The driving control apparatus 14 may be a processor configured to control respective operations of the power source 43 and the driving-force distribution mechanism 44 coupled to the driving control apparatus 14, and thereby individually control the respective driving forces acting on all of the four wheels 9. The driving control apparatus 14 may cause the driving force, which basically increases and decreases in accordance with an amount of an operation performed on the accelerator pedal, to act on the four wheels 9 while taking balance of the driving force among the four wheels 9.

Coupled to the braking control apparatus 15 may be, for example, a braking-force generation member 45 and a braking-force distribution mechanism 46. The braking-force generation member 45 may be adapted to decelerating and stopping the vehicle 1. In one example, the braking-force generation member 45 may be a hydraulic-pressure generation device. The hydraulic-pressure generation device may generate a hydraulic pressure with use of a portion of the driving force generated by the power source 43. The braking-force distribution mechanism 46 may transfer a braking force generated by the braking-force generation member 45 to all of the wheels 9 of the vehicle 1. The braking-force distribution mechanism 46 may include, for example, a hydraulic-pressure distribution member and a plurality of pressure regulating valves. In one example, the braking-force distribution mechanism 46 may adjust the braking force acting on each of the four wheels 9 on the basis of the setting and the traveling situation such as the slipping situation. The braking control apparatus 15 may be a processor configured to control respective operations of the braking-force generation member 45 and the braking-force distribution mechanism 46 coupled to the braking control apparatus 15, and thereby individually control the respective braking forces acting on all of the four wheels 9. The braking control apparatus 15 may cause the braking force, which basically increases and decreases in accordance with an amount of an operation performed on the brake pedal, to act on the four wheels 9 while adjusting balance of the braking force among the four wheels 9.

The steering control apparatus 16 may be a processor that executes a control adapted to switching of a traveling direction of the vehicle 1. The steering control apparatus 16 may basically increase and decrease an amount of the control adapted to the switching of the traveling direction of the vehicle 1 on the basis of an amount of steering performed on the steering wheel 6. The steering control apparatus 16 may control directions of only two of the wheels 9 on the front side, or may control directions of all of the four wheels 9 on the front side and the rear side.

The travel assistance control apparatus 13 may be a processor that executes travel assistance for the vehicle 1. In one example, the travel assistance control apparatus 13 may execute driving assistance in which an operation amount related to an operation is adjusted, on the basis of a driving operation performed by the driver. In another example, the travel assistance control apparatus 13 may execute driving assistance in which the operation amount is generated autonomously regardless of presence or absence of the driving operation performed by the driver. In a case where, while no driving operation is performed by the driver, the travel assistance control apparatus 13 generates an instruction regarding a driving operation amount, a braking operation amount, and a steering operation amount to control traveling of the vehicle 1, the driving assistance may be automatic driving. The travel assistance control apparatus 13 executing the driving assistance may supply the adjusted or generated instruction regarding operation amounts to the driving control apparatus 14, the braking control apparatus 15, and the steering control apparatus 16. For example, the travel assistance control apparatus 13 is configured to perform travel assistance for the traveling of the vehicle 1 in a braking-and-driving-force distribution control mode and configured to perform travel assistance for the traveling of the vehicle 1 in an automatic cruise control mode adapted to all vehicle speeds. The braking-and-driving-force distribution control mode is a control mode in which distribution of a driving force or distribution of a braking force to the plurality of wheels 9 of the vehicle 1 is adjusted while the vehicle 1 is traveling at a low speed.

The travel assistance setting apparatus 11 may set, in the travel assistance control apparatus 13, the travel assistance for the vehicle 1 to be executed by the travel assistance control apparatus 13.

The travel assistance setting apparatus 11 may include a timer 21, an input and output unit 22, a central processing unit (CPU) 23, and a memory 24, and also include a system bus 25 which these components are coupled to. Note that the other apparatuses described above may each basically include a timer, an input and output unit, a CPU, and a memory, and also include a system bus which these components are coupled to.

Coupled to the travel assistance setting apparatus 11 may be an operation unit 18. The operation unit 18 may include a driving switching button 31 and an automatic cruise control (ACC) button 32. In one example, the operation unit 18 may be coupled to the in-vehicle network 17. The operation unit 18 may receive an operation performed by an occupant such as the driver of the vehicle 1. In one example, the operation unit 18 may be coupled to the system bus 25, and supply, on the basis of respective operations performed on the driving switching button 31 and the automatic cruise control button 32, selection operation information regarding those buttons to the CPU 23 of the travel assistance setting apparatus 11.

The timer 21 may measure a time period and time.

The input and output unit 22 may be coupled to the in-vehicle network 17. The input and output unit 22 may supply and receive data with an input and output unit 22 of another apparatus via the in-vehicle network 17.

The memory 24 may allow for recording of, for example, a program to be executed by the CPU 23 and various pieces of data. The memory 24 may include a non-volatile memory, a volatile memory, or a combination thereof. Examples of the non-volatile memory may include a semiconductor memory having a data holding function and a hard disk drive. Examples of such a semiconductor memory may include an electrically erasable programmable read-only memory (EEPROM) and a solid state drive (SSD). Examples of the volatile memory may include a semiconductor memory such as a random-access memory (RAM).

Note that, as will be described later, in one example, the memory 24 may allow, in a case where an operation of selecting the braking-and-driving-force distribution control mode is received, automatic reactivation information of the braking-and-driving-force distribution control mode to be recorded even in a state where the speed of the vehicle 1 becomes an automatic deactivation speed or higher. The automatic deactivation speed may be a speed for which the travel assistance control apparatus 13 automatically deactivates the travel assistance in the braking-and-driving-force distribution control mode.

The CPU 23 may read the program recorded in the memory 24 and execute the program. The CPU 23 may thus serve as a control unit of the travel assistance setting apparatus 11.

Upon receiving new selection operation information from the operation unit 18, the CPU 23 serving as the control unit of the travel assistance setting apparatus 11 may supply setting information of travel assistance regarding which a selection operation is performed on the operation unit 18 to the travel assistance control apparatus 13, and set the setting information in the travel assistance control apparatus 13. In one example, the setting information may include setting information adapted to enabling the travel assistance in the travel assistance control apparatus 13, and deactivation information adapted to disabling the traveling assistance which is being executed by the travel assistance control apparatus 13.

In one example, such a travel assistance setting apparatus 11 may be provided in the vehicle 1 as the meter panel apparatus 7 illustrated in FIG. 1.

FIG. 3 is an explanatory diagram illustrating examples of driving-system control modes among which a driving-system control for the vehicle 1 illustrated in FIG. 1 is to be switched.

Listed in FIG. 3 are three braking-and-driving-force distribution control modes among which a driving-system control by the travel assistance control apparatus 13 may be switched, which are an X-mode, an I-mode, and an S-mode. Note that the travel assistance state of the vehicle 1 may include a traveling state where none of the X-mode, the I-mode, and the S-mode is set and where the distribution of the driving force and the distribution of the braking force to the wheels 9 are not adjusted.

The I-mode may be a normal traveling mode, in which, for example, a characteristic of the driving force or a characteristic of the braking force may be so made appropriate for normal traveling that the characteristic of the driving force or the characteristic of the braking force is appropriate for normal traveling on a pavement. Thus, in the I-mode, the driving force may be controlled. Note that, in the I-mode, the distribution of the driving force and the distribution of the braking force to the wheels 9 may not be changed.

The S-mode may be a sport traveling mode, in which, for example, the characteristic of the driving force or the characteristic of the braking force may be so made appropriate for sport traveling that the characteristic of the driving force or the characteristic of the braking force is appropriate for the sport traveling on a pavement. Thus, in the S-mode, the driving force may be controlled. Note that, in the S-mode, the distribution of the driving force and the distribution of the braking force to the wheels 9 may not be changed.

The X-mode may be a rough-road traveling mode, in which the distribution of the driving force and the distribution of the braking force to the wheels 9 may be so adjusted as to be appropriate for a non-pavement rough road, a wet pavement, and a pavement covered with accumulated snow or mud. Thus, the X-mode may be the braking-and-driving-force distribution control mode, unlike the I-mode or the S-mode. As compared with in the I-mode, in the X-mode, the travel assistance control apparatus 13 may so adjust the distribution of the driving force to the wheels 9, for example, as to distribute the driving force acting on the wheel 9 involving a great slip to the wheel 9 involving a small slip. Further, the travel assistance control apparatus 13 may so adjust the driving force acting on the wheels 9 as to prevent an excessively large slip and to maintain low-speed traveling. In a case where the vehicle 1 travels down a largely inclined surface, the travel assistance control apparatus 13 may execute a braking control, and thereby so adjust the braking force acting on the wheels 9 as to maintain a low and constant speed of the vehicle 1. When the X-mode is set, the travel assistance control apparatus 13 may be allowed to so execute a control of assisting the traveling of the vehicle 1 as to adjust the distribution of the driving force or the distribution of the braking force to the wheels 9 of the vehicle 1 while the vehicle 1 is traveling at a low speed.

FIG. 4 is an explanatory diagram illustrating an example of an automatic cruise control mode for the vehicle 1 illustrated in FIG. 1.

A control in the automatic cruise control mode illustrated in FIG. 4 may include, for example, a preceding-vehicle following speed control within a set speed, a lane keep control, and a lane change control.

In the preceding-vehicle following speed control, the travel assistance control apparatus 13 may so execute a control of increasing and decreasing the speed of the vehicle 1 that an inter-vehicle distance based on a vehicle speed is maintained between the vehicle 1 and a preceding vehicle. The preceding vehicle may be estimated on the basis of an image captured by the vehicle external camera 42. When the speed of the vehicle 1 reaches a set speed, the travel assistance control apparatus 13 may so execute a deceleration control for the vehicle 1 as to prevent a further increase in vehicle speed.

In the lane keep control, the travel assistance control apparatus 13 may so execute the steering control for the vehicle 1 as to maintain traveling of the vehicle 1 on a traveling lane on which the vehicle 1 is traveling. The traveling lane on which the vehicle 1 is traveling may be estimated on the basis of an image captured by the vehicle external camera 42. The travel assistance control apparatus 13 may execute both the steering control for the vehicle 1 and the control of increasing and decreasing the speed of the vehicle 1.

In the lane change control, the travel assistance control apparatus 13 may so control the traveling of the vehicle 1 that the vehicle 1 performs lane change into a traveling lane adjacent to the traveling lane on which the vehicle 1 is currently traveling. The adjacent traveling lane may be estimated on the basis of an image captured by the vehicle external camera 42.

The travel assistance control apparatus 13 may be configured to so perform a control that the vehicle 1 basically follows the preceding vehicle while keep traveling on the traveling lane on which the vehicle 1 is currently traveling, by executing a coordinated control combining the above-described travel assistance controls. In a case where the lane change is allowed, the travel assistance control apparatus 13 may so perform a control that the vehicle 1 changes the traveling lane on which the vehicle 1 travels and follows the preceding vehicle on the traveling lane after the lane change.

In an automatic cruise control such as that of the example embodiment, basically, there is no limit regarding a vehicle speed. The travel assistance control apparatus 13 may be able to execute the travel assistance control in the automatic cruise control mode for all vehicle speeds including a speed of zero kilometer per hour.

A speed range within which the vehicle 1 is able to travel under the automatic cruise travel assistance may be overlapped with a speed range within which the vehicle 1 is able to travel under braking-and-driving assistance for rough-road traveling in the X-mode.

The automatic cruise control and the braking-and-driving assistance control for rough-road traveling in the X-mode may basically be executed at the same time for the vehicle 1. However, in a case where a plurality of travel assistance controls are executed at the same time, there remains a possibility that a travel assistance control state unexpected for solo travel assistance control is caused. Currently, in order to enhance comprehensive safety or safety regarding the travel assistance controls for the vehicle 1, it may be desired that execution of the plurality of travel assistance controls at the same time be avoided.

Accordingly, the travel assistance setting apparatus 11 may be configured to, for example, when the vehicle speed exceeds an automatic deactivation speed while the travel assistance in the braking-and-driving assistance control mode is performed, automatically cancel the travel assistance in the braking-and-driving assistance control mode, and accept an operation on the automatic cruise control button 32 adapted to enabling the automatic cruise travel assistance in a speed range higher than the automatic deactivation speed that causes cancellation of the braking-and-driving assistance control mode.

Further, the travel assistance setting apparatus 11 may accept an operation on the driving switching button 31 adapted to enabling the braking-and-driving assistance in a state where the automatic cruise travel assistance is disabled.

Thus, the travel assistance setting apparatus 11 may be able to prevent the braking-and-driving-force distribution control mode and the automatic cruise control mode from being enabled and executed at the same time by the travel assistance control apparatus 13.

However, if accepting of various enabling operations is so limited as to allow for enabling of one of the braking-and-driving-force distribution control mode and the automatic cruise control mode only in a state where the other is disabled, an operation load may be markedly increased in a case where the driver attempts to maintain the traveling of the vehicle 1 and also to keep benefiting from the driving assistance.

For example, in a case where the driver attempts to execute a first travel assistance control in a state where a second travel assistance control is being executed, the driver may need to perform an operation of disabling the second travel assistance control which is being executed, and also perform an operation of enabling the first travel assistance control to be newly executed.

In addition, for example, assume a case where the vehicle 1 is traveling on a road in which rough roads and pavements discontinuously and repeatedly appear. In the rough roads, the vehicle 1 may need to travel at a lower speed. In the pavements, the vehicle 1 may be able to travel at a high speed. In such a case, the driver may need to perform an operation of selecting the X-mode (the braking-and-driving assistance control) each time the driver wants to cause the vehicle 1 to travel on a road such as the rough road at a lower speed, because the X-mode is automatically deactivated each time the vehicle 1 travels on the pavement at a high speed.

Accordingly, in the vehicle 1 that is configured to use both the braking-and-driving assistance control mode, such as the X-mode, and the automatic cruise travel assistance control mode as travel assistance, it may be desired to reduce a load of a setting operation on the driver in a case where the driver attempts to keep benefiting from appropriate travel assistance even upon a change in traveling environment.

Figure 5:
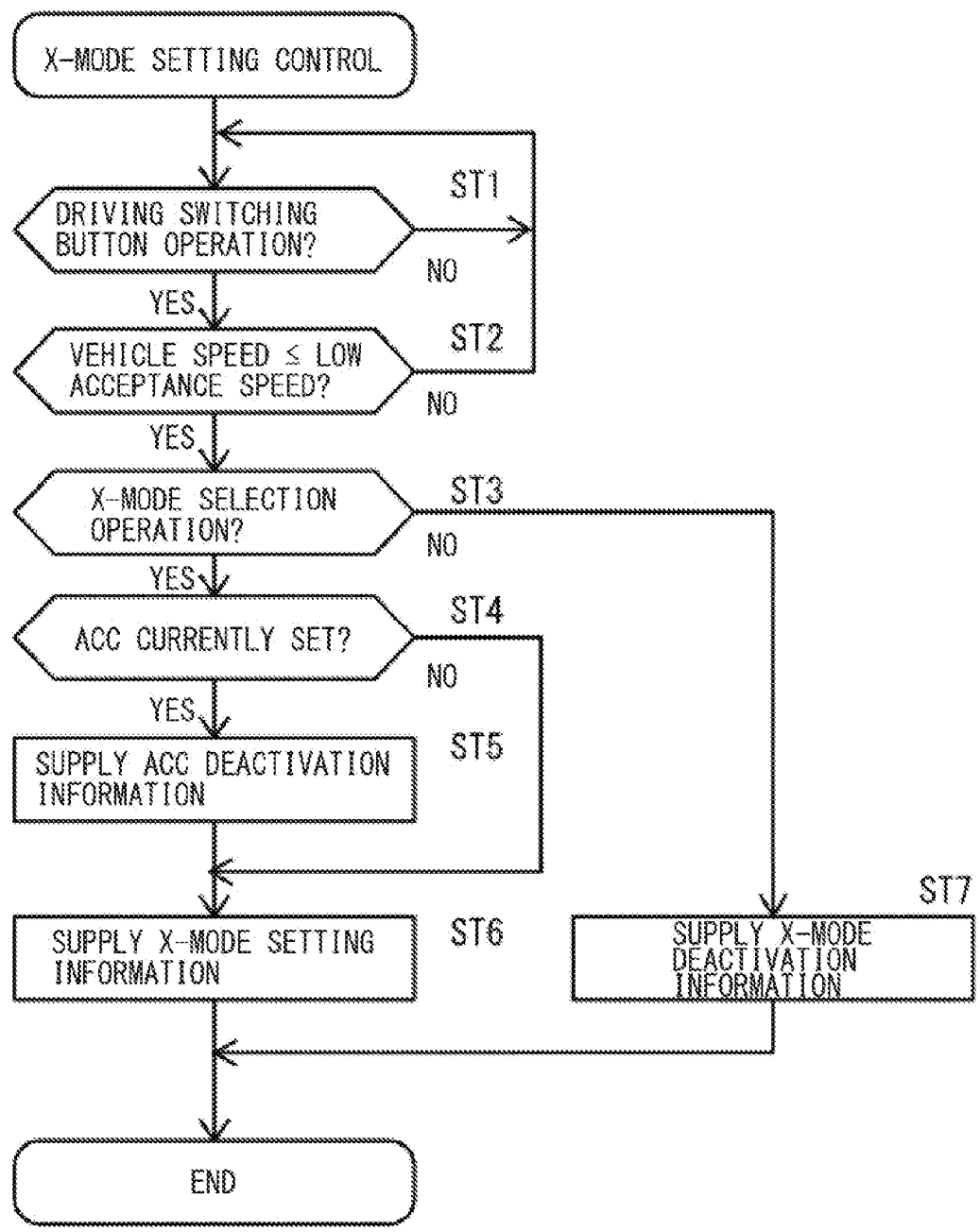
FIG. 5 is a flowchart illustrating an example of an X-mode setting control of adjusting distribution of a driving force and distribution of a braking force to a plurality of wheels, to be performed by a travel assistance setting apparatus for the vehicle illustrated in FIG. 2.

FIG. 5 is a flowchart illustrating an example of an X-mode setting control which is to be performed by the travel assistance setting apparatus 11 for the vehicle 1 illustrated in FIG. 2 and involves adjusting the distribution of the driving force and the distribution of the braking force to the wheels 9.

The CPU 23 of the travel assistance setting apparatus 11 may repeatedly execute the processes illustrated in FIG. 5.

In step ST1, the CPU 23 may determine whether a selection operation on the driving switching button 31 by an occupant such as the driver has been received. In one example, the driving switching button 31 may be a rotary button to be operated to select one of the X-mode, the I-mode, the S-mode, or braking-and-driving deactivation. Upon receiving selection operation information regarding the driving switching button 31 from the operation unit 18, the CPU 23 may determine that the selection operation on the driving switching button 31 has been received (ST1: YES), and cause the process to proceed to step ST2. If the selection operation information regarding the driving switching button 31 has not been received from the operation unit 18 (ST1: NO), the CPU 23 may repeat the process in step ST1.

In step ST2, the CPU 23 may determine whether the speed of the vehicle 1 is a low acceptance speed or lower. The low acceptance speed may be a speed set to allow acceptance of the selection operation on the driving switching button 31 for setting the X-mode. The CPU 23 may acquire the latest vehicle speed from the speed sensor 41. The CPU 23 may compare the acquired latest vehicle speed and the low acceptance speed with each other. In one example, the low acceptance speed may be the same as the upper-limit speed of a traveling range in the X-mode. The upper-limit speed of the traveling range in the X-mode may be, for example, 20 km/h or 30 km/h. Thus, if the speed of the vehicle 1 is the low acceptance speed or lower (ST2: YES), the CPU 23 serving as the travel assistance setting apparatus 11 may accept the selection operation for the X-mode on the operation unit 18. In the case where the speed of the vehicle 1 is the low acceptance speed or lower, the CPU 23 may cause the process to proceed to step ST3. If the speed of the vehicle 1 is not the low acceptance speed or lower (ST2: NO), the CPU 23 may cause the process to return to step ST1.

In step ST3, the CPU 23 may determine whether a setting operation on the driving switching button 31 of the operation unit 18 is a selection operation for setting the X-mode. If the setting operation on the driving switching button 31 of the operation unit 18 is the selection operation for setting the X-mode (ST3: YES), the CPU 23 may cause the process to proceed to step ST4. If the setting operation on the driving switching button 31 of the operation unit 18 is not the selection operation for setting the X-mode (ST3: NO), e.g., if the setting operation on the driving switching button 31 of the operation unit 18 is a selection operation for setting a mode other than the X-mode and deactivating the X-mode to newly set that mode, the CPU 23 may cause the process to proceed to step ST7.

In step ST4, the CPU 23 may determine whether the automatic cruise control is currently set. In one example, the CPU 23 may acquire information regarding the current setting state from the memory 24. If the automatic cruise control is currently set (ST4: YES), the CPU 23 may cause the process to proceed to step ST5. If the automatic cruise control is not currently set (ST4: NO), the CPU 23 may skip the process in step ST5, and cause the process to proceed to step ST6.

In step ST5, the CPU 23 may execute a process of deactivating the automatic cruise control. The CPU 23 may supply deactivation information of the automatic cruise control to the travel assistance control apparatus 13. The travel assistance control apparatus 13 may end the automatic cruise control.

In step ST6, the CPU 23 may execute a process of setting the X-mode. The CPU 23 may supply setting information of the X-mode to the travel assistance control apparatus 13. The travel assistance control apparatus 13 may start the braking-and-driving assistance control in the X-mode. Thereafter, the CPU 23 may end the X-mode setting control.

In step ST7, the CPU 23 may deactivate the setting of the X-mode. The CPU 23 may supply deactivation information of the X-mode to the travel assistance control apparatus 13. The travel assistance control apparatus 13 may end the braking-and-driving assistance control in the X-mode that has been executed until this timing. Thereafter, the CPU 23 may end the X-mode setting control.

As described above, the CPU 23 may be allowed to accept the selection operation regarding the braking-and-driving-force distribution control mode performed through the selection operation on the driving switching button 31 in a case where the speed of the vehicle 1 is the low acceptance speed or lower.

Figure 6:
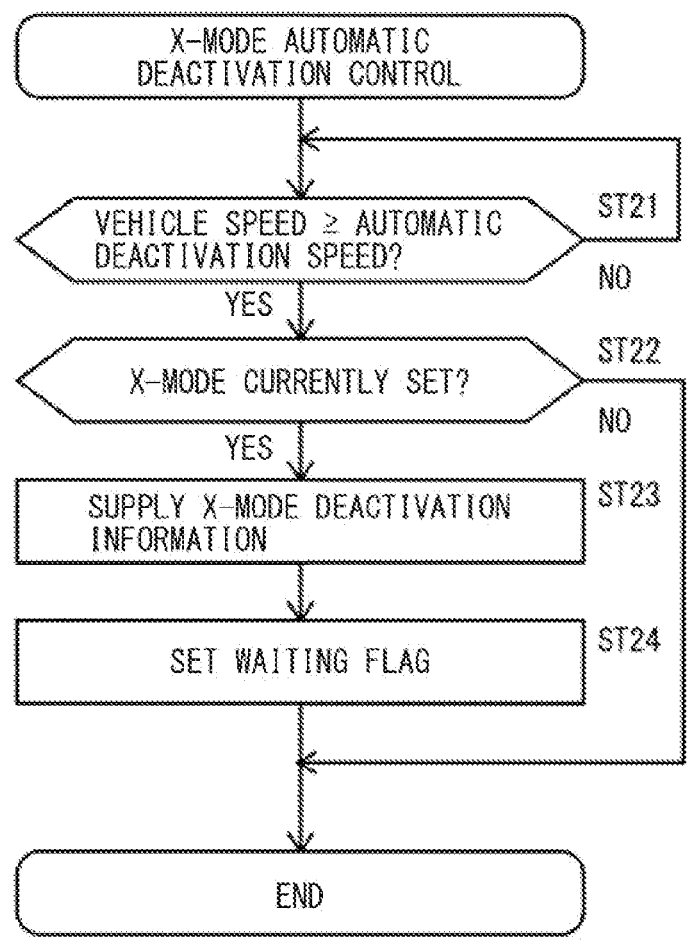
FIG. 6 is a flowchart illustrating an example of an X-mode automatic deactivation control to be performed by the travel assistance setting apparatus for the vehicle illustrated in FIG. 2.

FIG. 6 is a flowchart illustrating an example of an X-mode automatic deactivation control to be performed by the travel assistance setting apparatus 11 for the vehicle 1 illustrated in FIG. 2.

The CPU 23 of the travel assistance setting apparatus 11 may repeatedly execute the processes illustrated in FIG. 6 to automatically deactivate the braking-and-driving assistance control in the X-mode performed by the travel assistance control apparatus 13.

Note that the CPU 23 may also automatically deactivate a driving-system control mode other than the X-mode, e.g., the I-mode or the S-mode, by processes similar to those illustrated in FIG. 6.

In step ST21, the CPU 23 may determine whether the speed of the vehicle 1 is an automatic deactivation speed or higher. The automatic deactivation speed may be a speed set to allow deactivation of the X-mode. The CPU 23 may acquire the latest vehicle speed from the speed sensor 41. The CPU 23 may compare the acquired latest vehicle speed and the automatic deactivation speed with each other. In one example, the automatic deactivation speed may be the same as the upper-limit speed of the traveling range in the X-mode. The upper-limit speed of the traveling range in the X-mode may be, for example, 20 km/h or 30 km/h. If the speed of the vehicle 1 is the automatic deactivation speed or higher (ST21: YES), the CPU 23 may cause the process to proceed to step ST23. If the speed of the vehicle 1 is not the automatic deactivation speed or higher (ST21: NO), the CPU 23 may repeat the process in ST21.

In step ST22, the CPU 23 may determine whether the X-mode is currently set. In one example, the CPU 23 may acquire setting information regarding the last travel assistance executed by the travel assistance control apparatus 13 from the memory 24, to thereby determine whether the X-mode is currently set. If the X-mode is currently set (ST22: YES), the CPU 23 may cause the process to proceed to step ST23. If the X-mode is not currently set (ST22: NO), the CPU 23 may end the X-mode automatic deactivation control.

In step ST23, the CPU 23 may execute a process of deactivating the X-mode. The CPU 23 may supply deactivation information of the X-mode to the travel assistance control apparatus 13. The travel assistance control apparatus 13 may end the braking-and-driving assistance control in the X-mode that has been executed until this timing. Thereafter, the CPU 23 may cause the process to proceed to step ST24.

In step ST24, the CPU 23 may set a waiting flag for the X-mode which has been automatically deactivated. In one example, the CPU 23 may set the waiting flag for the X-mode in the memory 24. The waiting flag may be automatic reactivation information of the braking-and-driving-force distribution control mode. Thereafter, the CPU 23 may end the X-mode automatic deactivation control.

Figure 7:
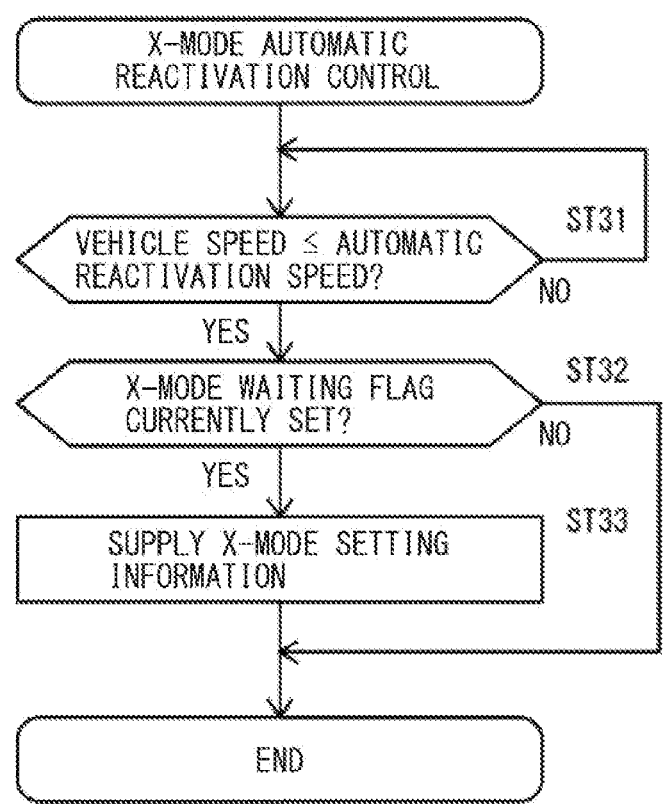
FIG. 7 is a flowchart illustrating an example of an X-mode automatic reactivation control to be performed by the travel assistance setting apparatus for the vehicle illustrated in FIG. 2.

FIG. 7 is a flowchart illustrating an example of an X-mode automatic reactivation control to be performed by the travel assistance setting apparatus 11 for the vehicle 1 illustrated in FIG. 2.

The CPU 23 of the travel assistance setting apparatus 11 may repeatedly execute the processes illustrated in FIG. 7 to automatically set again the braking-and-driving assistance control in the X-mode and thereby automatically reactivating the braking-and-driving assistance control in the X-mode.

Note that the CPU 23 may also automatically set again a driving-system control mode other than the X-mode, e.g., the I-mode or the S-mode, to thereby reactivate that driving-system control mode which has been automatically deactivated, by processes similar to those illustrated in FIG. 7.

In step ST31, the CPU 23 may determine whether the speed of the vehicle 1 is an automatic reactivation speed or lower. The automatic reactivation speed may be a speed set to allow re-setting of the X-mode. The CPU 23 may acquire the latest vehicle speed from the speed sensor 41. The CPU 23 may compare the acquired latest vehicle speed and the automatic reactivation speed with each other. The automatic reactivation speed may be any speed as long as it is not higher than the automatic deactivation speed. In one example, the automatic reactivation speed may be the upper-limit speed of the traveling range in the X-mode, as with the automatic deactivation speed. The upper-limit speed of the traveling range in the X-mode may be, for example, 20 km/h or 30 km/h. If the speed of the vehicle 1 is the automatic reactivation speed or lower (ST31: YES), the CPU 23 may cause the process to proceed to step ST32. If the speed of the vehicle 1 is not the automatic reactivation speed or lower (ST31: NO), the CPU 23 may repeat the process in ST31.

In step ST32, the CPU 23 may determine whether the waiting flag for the X-mode is currently set. In one example, the CPU 23 may acquire the waiting flag for the X-mode from the memory 24, to thereby determine whether the X-mode is currently in a waiting state. If the X-mode is currently in the waiting state (ST32: YES), the CPU 23 may cause the process to proceed to step ST33. If the X-mode is not currently in the waiting state (ST32: NO), the CPU 23 may end the X-mode automatic reactivation control.

In step ST33, the CPU 23 may execute a process of setting the X-mode again. The CPU 23 may supply the setting information of the X-mode to the travel assistance control apparatus 13. The travel assistance control apparatus 13 may start the braking-and-driving assistance control in the X-mode. Thereafter, the CPU 23 may end the X-mode automatic reactivation control.

As described above, after the operation unit 18 receives the operation of selecting the X-mode as the braking-and-driving-force distribution control mode, in a case where the speed of the vehicle 1 detected by the vehicle speed sensor becomes the automatic deactivation speed or higher and thereafter becomes the automatic reactivation speed or lower or becomes the automatic deactivation speed or lower, the CPU 23 of the travel assistance setting apparatus 11 serving as the travel assistance setting apparatus 11 may newly supply the setting information of the X-mode to the travel assistance control apparatus 13 even if the operation unit 18 receives no selection operation. The automatic deactivation speed may be a speed for which the travel assistance control apparatus 13 deactivates the travel assistance in the X-mode. Each time the vehicle speed is decreased from a speed that is the automatic reactivation speed or higher or a speed that is the automatic deactivation speed or higher to a speed that is the automatic reactivation speed or lower or a speed that is the automatic deactivation speed or lower, the X-mode which has been deactivated may be set again, and the travel assistance control apparatus 13 may be able to execute the braking-and-driving assistance control in the X-mode.

Moreover, in a case where the waiting flag for the X-mode is not recorded in the memory 24, the CPU 23 may not supply the setting information of the X-mode to the travel assistance control apparatus 13. The travel assistance control apparatus 13 may not execute the braking-and-driving assistance control in the X-mode which has been deactivated, even if the vehicle speed is decreased to a speed that is the automatic deactivation speed or lower or a speed that is the automatic deactivation speed or lower.

Figure 8:
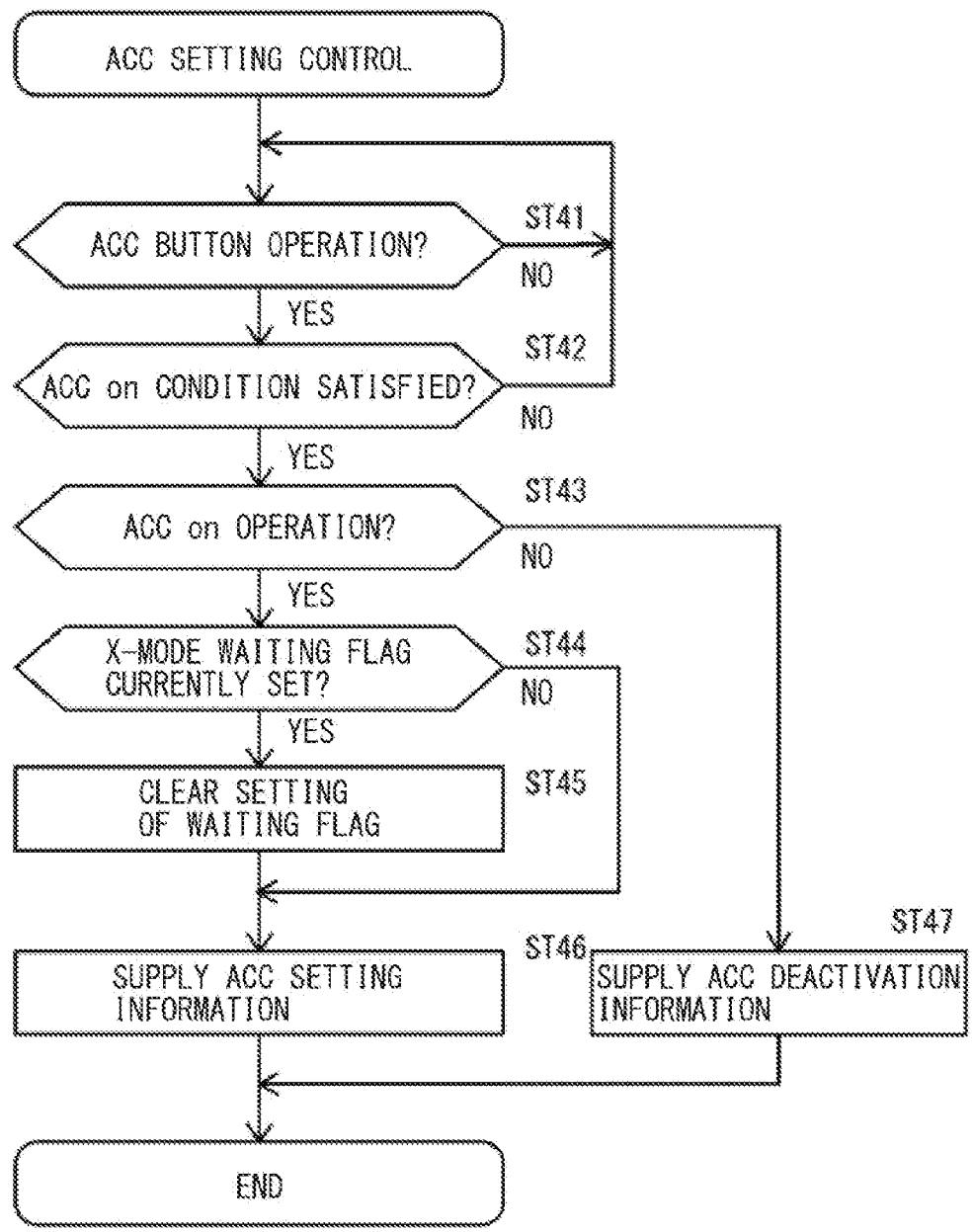
FIG. 8 is a flowchart illustrating an example of an automatic-cruise-control setting control to be performed by the travel assistance setting apparatus for the vehicle illustrated in FIG. 2.

FIG. 8 is a flowchart illustrating an example of an automatic-cruise-control setting control (ACC setting control) to be performed by the travel assistance setting apparatus 11 for the vehicle 1 illustrated in FIG. 2.

The CPU 23 of the travel assistance setting apparatus 11 may repeatedly execute the processes illustrated in FIG. 8 to execute or stop the automatic cruise control performed by the travel assistance control apparatus 13.

In step ST41, the CPU 23 may determine whether a selection operation on the automatic cruise control button 32 by an occupant such as the driver has been received. In one example, the automatic cruise control button 32 may be a toggle button to be operated to perform switching between an enabled state and a disabled state of the automatic cruise control each time the automatic cruise control button 32 receives an operation. Upon receiving selection operation information regarding the automatic cruise control button 32 from the operation unit 18, the CPU 23 may determine that the selection operation on the automatic cruise control button 32 has been received (ST41: YES), and cause the process to proceed to step ST42. If the selection operation information regarding the automatic cruise control button 32 has not been received from the operation unit 18 (ST41: NO), the CPU 23 may repeat the process in step ST41.

In step ST42, the CPU 23 may determine whether a condition to allow turning-on of the automatic cruise control mode is satisfied. For example, in a case where the setting information of the X-mode is supplied to the travel assistance control apparatus 13 and the vehicle 1 is traveling under the traveling control in the X-mode, the tuning-on of the automatic cruise control mode may basically be inhibited. If the condition to allow the turning-on of the automatic cruise control mode is satisfied (ST42: YES), the CPU 23 may cause the process to proceed to step ST43. If the condition to allow the turning-on of the automatic cruise control mode is not satisfied (ST42: NO), the CPU 23 may cause the process to return to step ST41.

In step ST43, the CPU 23 may determine whether the selection operation on the automatic cruise control button 32 of the operation unit 18 is an ON-operation of setting the automatic cruise control. If the selection operation information regarding the automatic cruise control button 32 is regarding switching to setting, the CPU 23 may determine that the selection operation on the automatic cruise control button 32 is an operation for setting the automatic cruise control (ST43: YES), and cause the process to proceed to step ST44. If the selection operation information regarding the automatic cruise control button 32 is regarding switching to deactivation of the setting, the CPU 23 may determine that the selection operation on the automatic cruise control button 32 is an operation for deactivating the automatic cruise control (ST43: NO), and cause the process to proceed to step ST47.

In step ST44, the CPU 23 may determine whether the waiting flag for the X-mode is currently set. In one example, the CPU 23 may determine whether the waiting flag for the X-mode is currently set on the basis of the memory 24. If the waiting flag for the X-mode is currently set (ST44: Y), the CPU 23 may cause the process to proceed to step ST45. If the waiting flag for the X-mode is not currently set (ST44: N), the CPU 23 may cause the process to proceed to step ST46.

In step ST45, the CPU 23 may clear the setting of the waiting flag for the X-mode. In one example, the CPU 23 may overwrite the waiting flag in the memory 24 with a clearing value. The CPU 23 may thereby be able to delete, from the memory 24, the automatic reactivation information of the braking-and-driving-force distribution control mode recorded in the memory 24.

In step ST46, the CPU 23 may execute a process of setting the automatic cruise control. The CPU 23 may supply setting information of the automatic cruise control to the travel assistance control apparatus 13. The travel assistance control apparatus 13 may start the automatic cruise control. Thereafter, the CPU 23 may end the automatic-cruise-control setting control.

In step ST47, the CPU 23 may execute a process of deactivating the automatic cruise control. The CPU 23 may supply deactivation information of the automatic cruise control to the travel assistance control apparatus 13. The travel assistance control apparatus 13 may end the automatic cruise control that is currently executed. Thereafter, the CPU 23 may end the automatic-cruise-control setting control.

As described above, the CPU 23 of the travel assistance setting apparatus 11 may accept the selection operation regarding the automatic cruise control performed on the operation unit 18, in a case where the condition to allow the turning-on of the automatic cruise control mode is satisfied.

Further, in a case where the operation unit 18 receives the operation of selecting the X-mode as the braking-and-diving-force distribution control, and thereafter receives the operation of selecting the automatic cruise control, the CPU 23 may clear the waiting flag for the X-mode recorded in the memory 24, and thereby cancel the automatic reactivation of the X-mode thereafter. In addition, the CPU 23 may supply the setting information of the automatic cruise control to the travel assistance control apparatus 13. The CPU 23 may thus cause the travel assistance control apparatus 13 to execute the automatic cruise control exclusively with respect to the braking-and-driving-force distribution control mode.

In such a case where the operation of selecting the X-mode is performed, and the operation of selecting the automatic cruise control is thereafter performed, it is likely that the occupant has expected or determined that the traveling environment in the future does not include any rough road. The travel assistance control apparatus 13 may be able to continuously execute the travel assistance favorably compatible with such expectation or determination of the occupant. Even if the vehicle speed is lowered later while the travel assistance is performed under the automatic cruise control, the travel assistance control apparatus 13 may not switch the assistance control from the automatic cruise control to the X-mode without any instruction from an occupant.

FIG. 9 is a transition diagram describing examples of travel assistance settings to be configured by the travel assistance setting apparatus 11 for the vehicle 1 illustrated in FIG. 2.

In FIG. 9, six examples of current settings regarding the travel assistance are listed from left to right, numbered from 1 to 6.

In a first current setting, the automatic cruise control mode is OFF and the X-mode is OFF. In addition, the speed of the vehicle 1 is a low speed which is the low acceptance speed or lower.

In a second current setting, the automatic cruise control mode is ON and the X-mode is OFF. In addition, the speed of the vehicle 1 is the low speed which is the low acceptance speed or lower.

In a third current setting, the automatic cruise control mode is OFF and the X-mode is ON. In addition, the speed of the vehicle 1 is the low speed which is the low acceptance speed or lower.

In a fourth current setting, the automatic cruise control mode is ON and the X-mode is OFF. In addition, the speed of the vehicle 1 is a high speed which is a high acceptance speed or higher. The high acceptance speed may be a speed higher than the low acceptance speed.

In a fifth current setting, the automatic cruise control mode is OFF and the X-mode is in a waiting state (OFF). In addition, the speed of the vehicle 1 is the high speed which is the high acceptance speed or higher.

In a sixth current setting, the automatic cruise control mode is OFF and the X-mode is OFF. In addition, the speed of the vehicle 1 is the high speed which is the high acceptance speed or higher.

As can be seen from the above-described examples, i.e., the first to the sixth current settings, the travel assistance setting apparatus 11 may so control the setting as to avoid a situation where both the automatic cruise control mode and the X-mode are ON at the same time.

Further, each column in FIG. 9 describes an example of an operation or a change in the traveling state that causes a change in the current setting.

A first column describes a case where the speed of the vehicle 1 changes to a high speed which is the automatic deactivation speed or higher.

In this case, the first current setting may be changed to a sixth setting state. Although the speed of the vehicle 1 is increased by acceleration, the automatic cruise control mode may be kept OFF (deactivated) and the X-mode may be kept OFF.

The second current setting may be changed to a fourth setting state. Although the speed of the vehicle 1 is increased by acceleration, the automatic cruise control mode may be kept ON (set) and the X-mode may be kept OFF.

The third current setting may be changed to a fifth setting state. Although the speed of the vehicle 1 is increased by acceleration, the automatic cruise control mode may be kept OFF. However, the X-mode may be changed from ON to the waiting state (OFF).

As described above, in a case where the speed of the vehicle 1 is increased by acceleration, the travel control in the X-mode performed by the travel assistance control apparatus 13 may be turned off.

Note that in each of the fourth to the sixth current settings where the speed of the vehicle 1 is already the high speed, the current setting may be maintained.

A second column describes a case where the speed of the vehicle 1 changes to a low speed which is the automatic reactivation speed or lower.

In this case, the fourth current setting may be changed to a second setting state. Although the speed of the vehicle 1 is decreased by deceleration, the automatic cruise control mode may be kept ON and the X-mode may be kept OFF.

The fifth current setting may be changed to a third setting state. Although the speed of the vehicle 1 is decreased by deceleration, the automatic cruise control mode may be kept OFF and the X-mode may be changed from the waiting state (OFF) to ON.

The six current setting may be changed to a first setting state. Although the speed of the vehicle 1 is decreased by deceleration, the automatic cruise control mode may be kept OFF and the X-mode may be kept OFF.

As described above, when the speed of the vehicle 1 is decreased by deceleration, if the X-mode has been in the waiting state (OFF) before such a timing, the X-mode may be turned on.

Note that in each of the first to the third current settings where the speed of the vehicle 1 is already the low speed, the current setting may be maintained.

A third column describes a case where the driving switching button 31 is so operated that the X-mode is turned on.

In this case, the first and the second current settings, where the current speed of the vehicle 1 is kept low, may each be changed to the third current setting. As to the third current setting, the third setting state may be maintained.

Thus, if the operation of turning on the X-mode is performed by means of the driving switching button 31 in a case where the current speed of the vehicle 1 is the low acceptance speed or lower, the automatic cruise control mode may be turned off and the X-mode may be turned on.

Note that in each of the fourth to the sixth current settings where the current setting is the high speed, the current setting may be maintained while the operation of turning on the X-mode is ignored.

A fourth column describes a case where the automatic cruise control button 32 is so operated that the automatic cruise control mode is turned on.

In this case, the fifth and the sixth current settings, where the current speed of the vehicle 1 is kept high, may each be changed to the fourth current setting. As to the fourth current setting, the fourth setting state may be maintained.

Thus, if the operation of turning on the automatic cruise control mode is performed by means of the automatic cruise control button 32 in a case where the current speed of the vehicle 1 is the high acceptance speed or higher, the waiting state (OFF) of the X-mode may be cleared and the automatic cruise control mode may be turned on.

Note that in each of the first to the third current settings where the current setting is the low speed, the current setting may be maintained while the operation of turning on the automatic cruise control mode is basically ignored.

However, in FIG. 9, the first current setting where the automatic cruise control mode is OFF may be changed to the second current setting where the automatic cruise control mode is ON. In this case, the automatic cruise control mode may be turned on as a result of the operation of turning on the automatic cruise control mode.

As to the third current setting where the X-mode is ON, the X-mode may be kept ON while the operation of turning on the automatic cruise control mode is ignored. In a case where the X-mode is already set, the X-mode may be kept ON while the operation of turning on the automatic cruise control mode is ignored.

As described above, in the example embodiment, basically, the CPU 23 serving as the travel assistance setting apparatus 11 may accept the selection operation regarding the X-mode on the operation unit 18 in a case where the speed of the vehicle 1 is the low acceptance speed or lower, and accept the selection operation regarding the automatic cruise control mode on the operation unit 18 in a case where the speed of the vehicle 1 is higher than or equal to the high acceptance speed which is higher than the low acceptance speed.

Figure 10:
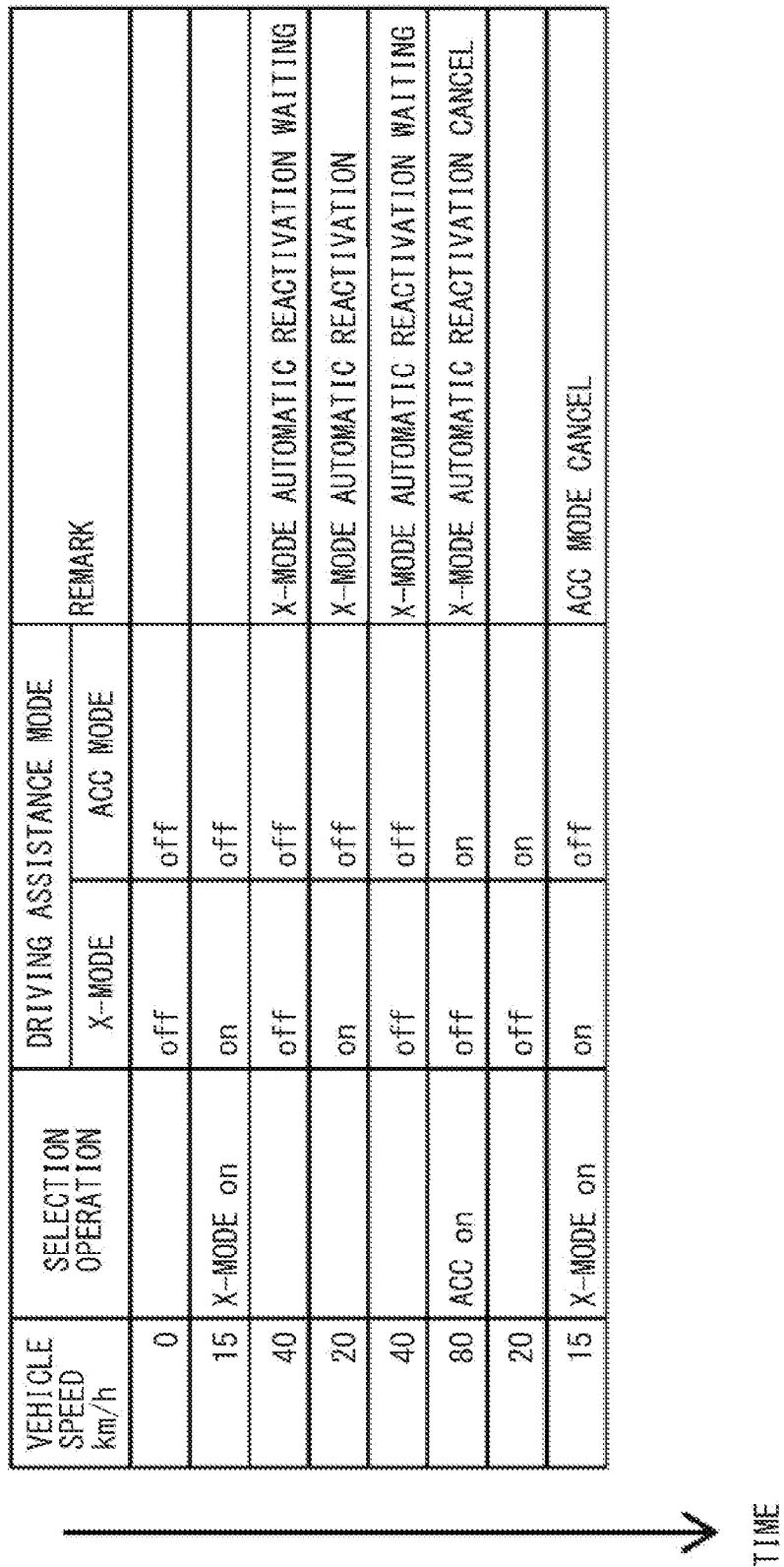
FIG. 10 is an explanatory diagram illustrating an example of a change in travel assistance state of the vehicle illustrated in FIG. 2.

FIG. 10 is an explanatory diagram illustrating an example of a change in the travel assistance state of the vehicle 1 illustrated in FIG. 1.

In FIG. 10, a plurality of travel assistance states each including the vehicle speed, the selection operation, and the content of the driving travel assistance are listed in order of time from top to bottom.

In a first travel assistance state on the top in FIG. 10, the vehicle 1 is stopped at a speed of 0 km/h. In addition, as the content of the driving travel assistance, the X-mode is in the OFF (deactivated) state and the automatic cruise control mode is also in the OFF state.

The vehicle 1 starts traveling after this timing.

In a second travel assistance state, the vehicle 1 is traveling at a speed of 15 km/h. The driver performs a selection operation of turning on the X-mode. Accordingly, the X-mode may be changed from the OFF state to the ON (set) state and the automatic cruise control mode may be kept in the OFF state.

In a third travel assistance state, the speed of the vehicle 1 is increased to 40 km/h. The vehicle speed becomes high and the X-mode may be changed from the ON state to the OFF state (the waiting state) which allows for automatic reactivation. The automatic cruise control mode may be kept OFF.

In a fourth travel assistance state, the speed of the vehicle 1 is decreased to 20 km/h. The vehicle speed becomes low, and the X-mode may be automatically changed from the OFF state (the waiting state) which allows for automatic re-setting to the ON state without the driver's selection operation being received. The automatic cruise control mode may be kept in the OFF state.

In a fifth travel assistance state, the speed of the vehicle 1 is increased again to 40 km/h. The vehicle speed becomes high, and the X-mode may be changed from the ON state to the OFF state (the waiting state) which allows for automatic reactivation. The automatic cruise control mode may be kept in the OFF state.

In a sixth travel assistance state, the speed of the vehicle 1 is further increased to 80 km/h. In addition, the driver performs a selection operation of turning on the automatic cruise travel assistance. Accordingly, automatic reactivation regarding the X-mode may be canceled (cleared), and the X-mode may be changed from the OFF state (the waiting state) which allows for automatic reactivation to a simple OFF state. Further, the automatic cruise control mode may be changed from the OFF state to the ON state.

In a seventh travel assistance state, the speed of the vehicle 1 is decreased to 20 km/h. Even if the vehicle speed becomes low, the automatic cruise control mode may be kept in the ON state. The X-mode may be kept in the OFF state without being automatically reactivated.

In an eighth travel assistance state, the speed of the vehicle 1 is further decreased to 15 km/h. The driver performs a selection operation of turning on the X-mode. Accordingly, the automatic cruise control mode may be changed from the ON state to the OFF state and canceled. The X-mode may be changed from the OFF state to the ON state.

Thus, in a case where the operation unit 18 receives the operation of selecting the X-mode, further receives the operation of selecting the automatic cruise control mode, and thereafter receives the operation of selecting the X-mode again, the CPU 23 serving as the travel assistance setting apparatus 11 may supply the deactivation information of the automatic cruise control mode to the travel assistance control apparatus 13 and supply the setting information of the X-mode to the travel assistance control apparatus 13 by the control illustrated in FIG. 5.

As described above, according to the example embodiment, the occupant may need to perform the selection operation regarding the X-mode (the braking-and-driving-force distribution control mode) on the operation unit 18 only once to cause the travel assistance control apparatus 13 to automatically and repeatedly perform the travel assistance for the vehicle 1 in the X-mode while the vehicle 1 is traveling at the low speed which is the automatic reactivation speed or lower, regardless of the increase and decrease state of the traveling speed after the occupant performs the selection operation regarding the X-mode.

Each time the vehicle 1 travels at a lower speed, for example, on a rough road, the occupant is able to keep benefiting from the travel assistance in the X-mode without repeatedly perform the selection operation regarding the X-mode on the operation unit 18. For example, assume a case where the vehicle 1 is traveling on a road in which rough roads and pavements discontinuously and repeatedly appear. In the rough roads, the vehicle 1 may need to travel at a lower speed. In the pavements, the vehicle 1 may be able to travel at a high speed. In such a case, the occupant does not have to perform the selection operation regarding the X-mode on the operation unit 18 each time the vehicle 1 travels on, for example, a rough road, at a lower speed, even though the X-mode is automatically deactivated each time the vehicle 1 travels on a pavement at a high speed. Accordingly, the example embodiment makes it possible to avoid an excessively great operation load on the occupant, even in a case where the vehicle 1 is traveling in a special traveling environment unlike a normal situation where the vehicle 1 is continuously traveling on a pavement.

According to the example embodiment of the technology, it is possible to reduce the load on the occupant and to allow the occupant to keep benefiting from desired travel assistance regardless of a change in the traveling environment.

Therefore, in the example embodiment, for example, in a case where the operation of setting the automatic cruise control mode is received while the X-mode is temporarily deactivated, it is possible to prioritize activation of the automatic cruise control and to prevent automatic reactivation of the X-mode caused by a decrease in the vehicle speed.

Moreover, in the example embodiment, if the operation of turning on the X-mode is received again while the vehicle 1 is traveling at a low speed, it is possible to prioritize activation of the X-mode and cancel the automatic cruise control.

Although some example embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

For example, in the example embodiment described above, the CPU 23 of the travel assistance setting apparatus 11 may execute all of the setting controls illustrated in FIGS. 5 to 8 in the control system 10 serving as the travel assistance system for the vehicle 1.

Other apparatuses included in the control system 10, e.g., the sensor apparatus 12, the travel assistance control apparatus 13, the driving control apparatus 14, the braking control apparatus 15, and the steering control apparatus 16, may each include an input and output unit coupled to the in-vehicle network and a CPU, as with the travel assistance setting apparatus 11. In one example, the CPU of any of the sensor apparatus 12, the travel assistance control apparatus 13, the driving control apparatus 14, the braking control apparatus 15, and the steering control apparatus 16 may execute a portion or all of the processes performed by the CPU 23 of the travel assistance setting apparatus 11 described above. In another example, two or more CPUs may cooperate to share and execute the processes performed by the CPU 23 of the travel assistance setting apparatus 11 described above.

In the example embodiment described above, exclusive setting with respect to the automatic cruise control mode, and automatic deactivation and automatic reactivation according to the vehicle speed may be achieved only for the X-mode among the driving-system control modes listed in FIG. 3.

Other than the X-mode, for example, the exclusive setting with respect to the automatic cruise control mode, and automatic deactivation and automatic reactivation according to the vehicle speed may be achieved for the I-mode or the S-mode listed in FIG. 3. For example, in a case, unlike in the example described in FIG. 3, the I-mode or the S-mode is a control mode involving adjusting of the distribution of the driving force and the distribution of the braking force to the wheels 9, the exclusive setting with respect to the automatic cruise control mode, and automatic deactivation and automatic reactivation according to the vehicle speed may be achieved for the I-mode or the S-mode.

Regarding an existing automatic cruise travel assistance function, a control related thereto is canceled when a vehicle travels at a low speed. However, the automatic cruise travel assistance function has been developed to be adapted to all vehicle speeds including a speed of 0 km/h. In such a case, a speed range within which traveling under automatic cruise travel assistance is allowed may be overlapped with a speed range within which traveling under braking-and-driving-force distribution control for rough-road traveling is allowed. Basically, a plurality of travel assistance functions are able to be activated at the same time. However, there remains a possibility that a travel assistance control state unexpected for a solo travel assistance control is caused if the plurality of travel assistance functions are activated at the same time.

Accordingly, in order to prioritize comprehensive safety or safety, it is conceivable to avoid execution of the plurality of travel assistance controls at the same time. In this case, for example, it is conceivable to automatically cancel the braking-and-driving-force distribution control mode. It is also conceivable to allow setting of the automatic cruise travel assistance by a selection operation while the vehicle is traveling within a speed range higher than a speed that causes cancellation of the traveling assistance in the braking-and-driving-force distribution control mode.

However, if the braking-and-driving-force distribution control mode is automatically canceled, for example, in response to the vehicle speed reaching a predetermined speed, the operation load can be increased on the occupant's part in a case where the occupant attempts to receive appropriate travel assistance according to a change in traveling environment. It can be a load for the occupant to operate buttons each time the traveling environment changes. For example, assume a case where the vehicle is traveling on a road in which rough roads and pavements discontinuously and repeatedly appear. In the rough roads, the vehicle may need to travel at a lower speed. In the pavements, the vehicle may be able to travel at a high speed.

In such a case, the occupant may have to perform a selection operation regarding the braking-and-driving-force distribution control mode on an operation unit each time the vehicle travels on, for example, a rough road, at a lower speed, because the braking-and-driving-force distribution control mode is automatically deactivated each time the vehicle travels on a pavement at a high speed.

Regarding a vehicle, it is desired to make it possible to reduce a load on an occupant and to allow the occupant to keep benefiting from desired travel assistance regardless of a change in traveling environment.

According to an embodiment of the technology, an occupant may need to perform a selection operation regarding a braking-and-driving-force distribution control mode on an operation unit only once to repeatedly perform travel assistance for a vehicle in the braking-and-driving-force distribution control mode while the vehicle is traveling at a low speed which is an automatic reactivation speed or lower, regardless of an increase and decrease state of the traveling speed after the occupant performs the selection operation regarding the braking-and-driving-force distribution control mode.

Each time the vehicle travels at a lower speed, for example, on a rough road, the occupant is able to benefit from the travel assistance in the braking-and-driving-force distribution control mode without performing the selection operation regarding the braking-and-driving-force distribution control mode on the operation unit. For example, assume a case where the vehicle is traveling on a road in which rough roads and pavements discontinuously and repeatedly appear. In the rough roads, the vehicle may need to travel at a lower speed. In the pavements, the vehicle may be able to travel at a high speed. In such a case, the occupant does not have to perform the selection operation regarding the braking-and-driving-force distribution control mode on the operation unit each time the vehicle travels on, for example, a rough road, at a lower speed, even though the braking-and-driving-force distribution control mode is automatically deactivated each time the vehicle travels on a pavement at a high speed. Accordingly, an example embodiment of the technology makes it possible to avoid an excessively great operation load on the occupant, even in a case where the vehicle is traveling in a special traveling environment unlike a normal situation where the vehicle is traveling on a pavement.

According to an example embodiment of the technology, it is possible to reduce a load on an occupant and to allow the occupant to keep benefiting from desired travel assistance regardless of a change in traveling environment.

The invention claimed is:

1. A vehicle travel assistance system comprising:
    a travel assistance control unit configured, in a braking-and-driving-force distribution control mode, to control distribution of a driving force or a braking force to wheels of a vehicle; and
    a travel assistance setting unit configured to activate, deactivate, or reactivate the braking-and-driving-force distribution control mode based on a speed of the vehicle,
    wherein the travel assistance setting unit deactivates the braking-and-driving-force distribution control mode based on determining that the speed of the vehicle becomes equal to or greater than a first speed while the braking-and-driving-force distribution control mode is activated in the vehicle, and
    wherein the travel assistance setting unit reactivates the braking-and-driving-force distribution control mode based on determining that the speed of the vehicle becomes equal to or less than a second speed lower than the first speed while the braking-and-driving-force distribution control mode is deactivated in the vehicle due to the speed of the vehicle becoming equal to or greater than the first speed, wherein the vehicle travel assistance system further comprises a memory, wherein the travel assistance setting unit is configured to record automatic reactivation information of the braking-and-driving-force distribution control mode in the memory based on determining that the speed of vehicle becomes equal to or greater than the first speed while the braking-and-driving-force distribution control mode is activated in the vehicle, wherein the travel assistance setting unit is configured to automatically supply the automatic reactivation information to the travel assistance control unit to reactivate the braking-and-driving-force distribution control mode based on determining that the speed of vehicle becomes equal to or less than the second speed, and wherein the travel assistance setting unit is further configured to, based on (1) selecting an automatic cruise control mode after recording the automatic reactivation information in the memory and (2) determining that the speed of the vehicle is equal to or greater than the first speed, i) delete the automatic reactivation information from the memory, and ii) supply setting information to perform the travel assistance in the automatic cruise control mode to the travel assistance control unit.

2. The vehicle travel assistance system according to claim 1, wherein the travel assistance setting unit is further configured to, based on (1) selecting the braking-and-driving-force distribution control mode after selecting an automatic cruise control mode and (2) determining that the speed of the vehicle is equal to or less than the second speed, i) supply deactivation information of the automatic cruise control mode to the travel assistance control unit and ii) supply setting information of the braking-and-driving-force distribution control mode to the travel assistance control unit.

3. A vehicle travel assistance system comprising:
one or more processors;
a memory stores instructions that, when executed by the one or more processors, cause the one or more processors to perform processing comprising:
controlling, in a braking-and-driving-force distribution control mode, distribution of a driving force or a braking force to wheels of a vehicle;
deactivating the braking-and-driving-force distribution control mode based on determining that a speed of the vehicle becoming equal to or greater than a first speed in the braking-and-driving-force distribution control mode; and
reactivating the braking-and-driving-force distribution control mode based on determining that the speed of the vehicle becoming equal to or less than a second speed lower than the first speed while the braking-and-driving-force distribution control mode is deactivated in the vehicle due to the speed of the vehicle becoming equal to or greater than the first speed,
wherein the processing further comprises:
recording an automatic reactivation information of the braking-and-driving-force distribution control mode in the memory based on determining that the speed of vehicle becomes equal to or greater than the first speed while the braking-and-driving-force distribution control mode is activated in the vehicle,
receiving the automatic reactivation information from the memory to reactivate the braking-and-driving-force distribution control mode based on determining that the speed of vehicle becomes equal to or less than the second speed, and
executing, based on: (1) selecting an automatic cruise control mode after recording the automatic reactivation information in the memory; and (2) determining that the speed of the vehicle is equal to or greater than the first speed, i) a deletion of the automatic reactivation information from the memory, and ii) a set of information to perform the travel assistance in the automatic cruise control mode.

4. A vehicle travel assistance system comprising:
a travel assistance control unit configured, in a braking-and-driving-force distribution control mode, to control distribution of a driving force or a braking force to wheels of a vehicle; and
a travel assistance setting unit configured to activate, deactivate, or reactivate the braking-and-driving-force distribution control mode based on a speed of the vehicle,
wherein the travel assistance setting unit deactivates the braking-and-driving-force distribution control mode based on determining that the speed of the vehicle becomes equal to or greater than a first speed while the braking-and-driving-force distribution control mode is activated in the vehicle,
wherein the travel assistance setting unit reactivates the braking-and-driving-force distribution control mode based on determining that the speed of the vehicle becomes equal to or less than a second speed lower than the first speed while the braking-and-driving-force distribution control mode is deactivated in the vehicle due to the speed of the vehicle becoming equal to or greater than the first speed, and
wherein the travel assistance setting unit is further configured to, based on (1) selecting the braking-and-driving-force distribution control mode after selecting an automatic cruise control mode and (2) determining that the speed of the vehicle is equal to or less than the second speed, i) supply deactivation information of the automatic cruise control mode to the travel assistance control unit, and ii) supply setting information of the braking-and-driving-force distribution control mode to the travel assistance control unit.

5. A vehicle travel assistance system comprising
one or more processors;
a memory that stores instructions that, when executed by the one or more processors, cause the one or more processors to perform processing comprising:
controlling, in a braking-and-driving-force distribution control mode, distribution of a driving force or a braking force to wheels of a vehicle;
deactivating the braking-and-driving-force distribution control mode based on determining that a speed of the vehicle becoming equal to or greater than a first speed in the braking-and-driving-force distribution control mode; and
reactivating the braking-and-driving-force distribution control mode based on determining that the speed of the vehicle becoming equal to or less than a second speed lower than the first speed while the braking-and-driving-force distribution control mode is deactivated in the vehicle due to the speed of the vehicle becoming equal to or greater than the first speed, wherein the processing further comprises executing, based on: (1) selecting the braking-and-driving-force distribution control mode after selecting an automatic cruise control mode; and (2) determining that the speed of the vehicle is equal to or less than the second speed, i) a supply of deactivation information of the automatic cruise control mode to the one or more processors and ii) a supply of setting information of the braking-and-driving-force distribution control mode to the one or more processors.

* * * * *